Patented Dec. 16, 1952

2,622,028

UNITED STATES PATENT OFFICE 2,622,028

PROCESS OF PREPARING POULTRY PRODUCTS

David Torr, New York, N. Y., assignor to Charles J. Ely, Oakland, N. J.

No Drawing. Application December 22, 1950, Serial No. 202,407

3 Claims. (Cl. 99—107)

This invention relates to improvements in the treatment of poultry and more particularly to the treatment of waste or low-grade poultry products and the production of improved food products therefrom. The invention includes an improved method of treating poultry products and also improved poultry products.

The present invention is more or less generally applicable to the treatment of poultry products of various kinds including chicken, duck, turkey, guinea fowl and other edible poultry or fowl for the production of improved products therefrom.

In the production of canned chicken and other canned poultry products it is customary to cook the chicken or other fowl and to separate from the cooked chicken the edible portions which can readily be canned to produce canned chicken, leaving a large portion of the chicken carcass, including the bones and attached meat which is not readily separated therefrom as well as the skins, fat, etc.

One of the objects of the present invention is the production of an improved canned chicken product, or other canned product containing the meat of chicken or other poultry which contain not only the readily marketable canned chicken meat but also other portions of the fowl in the form of a colloidal dispersion containing the bones and other constituents of the chicken in a colloidal state with the bone particles in a colloidal state of subdivision.

Another object of the invention is to treat chicken bones and attached meat, fat, skins, etc. for the production of a colloidal product therefrom containing the chicken bones in a state of colloidal subdivision uniformly dispersed in an organic matrix made up of other chicken constituents.

Another object of the invention is the production of blended meat products in the form of spreads, sausages, and other composite products containing colloidal chicken bone dispersed in a colloidal, organic matrix of other chicken constituents.

In making chicken or other poultry products it has been customary to cook the meat and to consume only the meat portion with a consequent loss of the values in the bone and other portions of the chicken, including the fat, skins, etc.; and sometimes the liquid resulting from the cooking has also been discarded.

It is recognized that the human body requires phosphorus and calcium as mineral constituents for the maintenance of health and that these elements are largely lacking in meats and in many diets. The present invention provides improved food products which contain chicken and other poultry bones in a colloidal state suspended in an organic matrix made up of other constituents of the fowl and in a form which makes them particularly valuable for supplying calcium and phosphorus dietary deficiencies.

The improved process of the present invention utilizes the chicken bones or other poultry bones together with other portions of the chicken or other poultry and includes the conversion of the admixed poultry materials, including the bones, into a colloidal product with the fine bone particles of colloidal size dispersed in a continuous colloidal plastic matrix of the organic constituents, including gelatin and gelatin yielding materials.

While chicken and other poultry bones are made up to a large extent of inorganic bone phosphate they also contain a large amount of organic matter. The bone structure, moreover, is of a complex character, being in part spongy and in part lamina, with bone layers deposited largely in concentric laminae which may be only a few microns in thickness. The bones are made up in part of cellular and in part of intercellular substances. The inorganic components of the poultry bones are largely phosphates, commonly considered to be calcium phosphate, but of a more or less complex composition. The organic material includes connective and intercellular tissues or cartilage, blood vessels and nerves, and bone marrow. The organic matter makes up a large proportion of the total solid materials of the bone and the organic constituents of the bones, except to the extent that they are extracted during cooking, are largely considered to be indigestible or unavailable in character.

In the improved process of the present invention the poultry bone material, including the inorganic components and the organic components, and with admixed other chicken material, is first subjected to crushing and to grinding and is then subjected to further and repeated disintegration and hydrolysis with progressive reduction in size of the bone particles until the entire mass is in a colloidal state containing both the organic and inorganic components of the bones. As a result the inorganic portions of the bones are in such a fine state of subdivision that even though present to a large extent in the colloidal product they are so blended with the organic material that they do not have the characteristic ground bone or bony feel or taste. In this form the inorganic matter is readily available as a food product and as a source of calcium and phosphorus. The organic components of the bone are also so disintegrated and broken down or hydrolyzed and blended in the colloidal product that they are largely available and valuable as edible constituents of the colloidal product.

The chicken or other poultry bones which are utilized and treated according to the present invention are bones of edible poultry commonly slaughtered and marketed as poultry products. They may have adhering fat, meat and sinews attached thereto as well as meat which is not readily removed therefrom.

The bones are advantageously used in a fresh, uncooked state, and converted into the new composite colloidal product which may be an uncooked product or may be cooked or sterilized during the disintegrating operation or subsequent thereto.

The raw, uncooked bones may be bones from which all of the readily marketable meat has been removed, but which contain admixed therewith portions of the fowl which are not readily marketable such as the neck and other portions of the fowl from which the meat is not readily separated. The bones may have admixed therewith poultry fat, skins, etc. They may also have more or less meat added thereto where it is desirable to produce a product of lower bone content and higher meat content.

Instead of using fresh, raw, uncooked bones or bones with adhering uncooked meat the bones may be first cooked either alone or with adhering and admixed meat and then subjected to the disintegrating and hydrolyzing operation to produce a colloidal product therefrom. When the bones are thus cooked they may be cooked at a relatively low temperature, much lower than commonly used for cooking the bones for the extraction of organic material therefrom.

In treating the bones, or the bones and admixed meat, fat, skins, etc., the bones are first broken up and crushed, e. g. by a hammer mill and bone crusher to relatively small pieces of e. g., $\frac{1}{16}''$ in size and are then further ground or crushed, e. g., in a hammer mill to around 100-mesh size. The material is then subjected to further reduction in particle size of the bones and the final reduction is advantageously carried out in a colloid mill in successive stages, e. g., in three or more successive stages with progressively closer setting of the colloid mill until finally the product is reduced to a colloidal state such that the inorganic bone particles are in general below 10 microns and advantageously below 5 microns, and with a range of e. g., 1 to 10 microns or less.

A Premier colloid mill with a vertical shaft and with rotor and stator adjustable as to clearance is advantageously used, with a speed of rotation of around 12,000 to 15,000 R. P. M. for a 4" diameter mill and with the surfaces of the rotor and stator of carborundum, which will exert the necessary grinding and shearing of the bone particles to reduce them to the ultimate state of fineness above indicated.

In disintegrating the poultry bones and admixed poultry material in such a colloid mill, where the final setting of the rotor and stator is almost zero clearance, a considerable amount of heat is generated and cooling may be necessary to avoid overheating of the material during the disintegration. By sufficient cooling of the mill the final product, if made from uncooked bones, can be recovered in an uncooked state.

By proper regulation of the temperature during the disintegration in the colloid mill the product may be sterilized or cooked to a greater or less extent by the heat generated in a closely set colloid mill.

The disintegrating operation is advantageously carried out in an inert atmosphere, such as nitrogen or carbon dioxide, or with protection of the material from the air to avoid oxidation. The colloid mill is thus advantageously provided with an enclosed hood or cover and with feed and discharge passages provided with protective covering so that the material is protected from air oxidation. Depending on the final produce desired the temperature in the colloid mill may range near the boiling point of water.

The heating of the bone material during disintegration may tend to remove more or less water therefrom and to dry out the product. This can be avoided, and a product of increased moisture content obtained when desired by admixing water with the product before or during the final disintegration to give a final product of a regulated and predetermined moisture content. Where the moisture content is around 15 to 30% the feed to the mill is advantageously a forced feed. With higher moisture content of the material, e. g., between 50 and 60%, or up to 100% or even 200 or 300 or 500% or higher based on the bone and other solid content (dry basis) the gravity feed may be sufficient.

The successive disintegrating and hydrolyzing operations result not only in progressive comminution of the inorganic bone material into finer and finer particle sizes but also result in a most intimate and homogeneous intermixture of the organic constituents with a breaking up of connective tissue, cartilage, blood vessels, marrow, and other organic matter and hydrolysis of protein and other constituents into an ultimate state of subdivision and hydrolysis which makes the organic material colloidal in character. The protein and nucleoprotein and the bone cartilage and other organic matter, including the marrow, etc., are not only thoroughly broken up and disintegrated into a colloidal state but are hydrolyzed and intimately and thoroughly blended with each other in the colloidal matrix in which the colloidal inorganic bone particles are held in uniform suspension.

The disintegrating and shearing action which reduces the inorganic bone material to a colloidal state of subdivision also acts upon the bone tissue and other organic material to subject them also to the shearing and disintegrating and hydrolyzing operation. As a result all of the components of the bones, and any adhering or admixed meat and fat, are converted into a homogeneous hydrolyzed colloidal gelatinous product which contains all of the bone substances. And the bone tissue material which is not commonly considered digestible is converted into such a finely divided state that it becomes digestible. By avoiding high temperature cooking, the protein material of bone is broken up and hydrolyzed by the present process into a form which makes available valuable constituents thereof, hereinafter described.

The disintegration, comminuting and hydrolysis of the product is carried to the point where the product is no longer gritty and no longer has the characteristic ground bone or bone meal taste or feel. In general a disintegration to a particle size of around 1 to 10 microns or less is sufficient for this purpose. With the bone particles so finely disintegrated the product is a palatable product, with the fat, proteins and hydrolyzed proteins and other inorganic and organic bone constituents so intimately blended that they have largely lost their indentity in the hydrolyzed colloidal gelatinous product. A similar product, or a product of even finer particle size, can be obtained by bombardment with gases, as in micronizing equipment, for the disintegration or for further disintegration of both the inorganic and organic components.

Where the poultry bones are freed more or less completely from adhering meat, etc. the finely disintegrated final product will contain the entire bone constituents including both the inorganic and organic material of the bones with the organic material largely reduced to a gelatinous state.

The disintegrated poultry bone products will vary somewhat in consistency but in general will be of a butter-like or gelatinous feel and consistency. It may vary in consistency from a thin jelly, where water is added, to a thick butter-like or stiff jelly product where the water content is low, or the product is partially dried during disintegration.

By further drying, advantageously in a vacuum or at a low temperature, a dry solid product is obtained which can be ground up into powder form. In general, however, the colloidal product in more or less thick jelly or gelatinous form can advantageously be used as a food product or for blending with other food products, for human consumption, or as an adjunct for animal or poultry feeding.

The new colloidal poultry bone products have a distinctive composition and contain a combination of highly valuable nutritional ingredients. They contain all of the inorganic constituents of the bone in a fine state of subdivision which makes them readily available to supply the nutritional requirements of these elements.

The new colloidal bone products also contain the organic constituents of the bone in a disintegrated and hydrolyzed or gelatinized state which makes them also readily available as food ingredients. The organic matter of the bone and also added and admixed organic matter such as meat, skins, fat, etc. will be converted into a colloidal matrix, butter-like or gelatinous in character with the finely divided colloidal bone particles dispersed therein.

The invention will be further illustrated by the following more detailed description:

Poultry such as chickens, after removal of the feathers, visera, head and feet, are cooked either with or without pressure, until the meat has been so thoroughly cooked as to be readily separable from the bone structure. The readily separated meat is then separated and the bone and attached meat which is not readily separated, together with the skin and portions of the meat which are not readily useful for canning, are subjected to a grinding and subsequent disintegrating treatment in a colloid mill, as above described, until the entire product is reduced to a colloidal consistency with the bone particles being, e. g., around 1 to 5 microns in size. The entire mass is thus converted into a smooth, buttery or gelatinous consistency containing the organic matter as well as the inorganic matter of the bones including the marrow and any admixed fat, skin, and meat in the form of a homogeneous colloidal matrix which is readily assimilable as a food product and which contains the colloidal bone particles uniformly distributed throughout the colloidal matrix.

The meat which is separated from the cooked chickens before the bone and other portions are subjected to disintegration, is placed in a can such as is used for canned chicken and the spaces between the pieces of chicken in the can are filled with the colloidal matrix before the can is closed and sealed. And the canned chicken can thus be subjected to sterilizing in the usual way.

The resulting canned chicken when cold is a solid mass since the colloidal bone material is of solid, gelatinous consistency and the entire contents of the can can be sliced. The pressure of the colloidal bone material in the can supplies a valuable mineral content useful in overcoming mineral deficiency in the human diet.

The colloidal bone material with varying amounts of admixed meat, fat, skins, etc. in the form of a colloidal matrix can advantageously be utilized in making sausages or for admixture with other materials to make bread spreads, etc.

The chicken bones and meat contain a substantial amount of gelatin or of protein converted into gelatin by the disintegrating and hydrolyzing treatment to which the material is subjected in converting it into a colloidal state. This gelatin content provides a valuable food ingredient of the colloidal product and converts the product when cold into a gelatinous state.

Where a considerable amount of meat and other chicken constituents, other than chicken bones, are included in the colloidal product it may itself be utilized as a food product, either alone or with added seasoning, for use as a gelatinous product or a bread spread.

The new colloidal products are also a valuable supplement for use with other food. They are palatable and can be admixed with salt or other condiments and utilized directly as a food product or as an adjunct with other food products. The high content of calcium and phosphorus and the colloidal nature of the bone material make the new products valuable as a supplement for use with other foods which are deficient in calcium and phosphorus. The new products not only supply such deficiency but also supply other valuable food ingredients.

The new colloidal products can also advantageously be admixed with other foods to form composite food products or balanced food rations. The products are thus valuable concentrated products for use in making soups or soup stock and for admixture with other ingredients for soup manufacture.

The new colloidal products are also valuable for use with other meat products such as are commonly used in making sausages of various kinds, deviled or potted meats or meat spreads, luncheon meats, etc., in amounts which will supply the dietary requirements, e. g. of calcium and phosphorus. It may thus be admixed in such products to the extent of 5% to 35% or more. The new colloidal products tend to give a firmer consistency to many of the composite meat products with which they are admixed.

The new colloidal products are also advantageously admixed with meat such as is used for meat loaf or canned ground meat products, including both poultry products and other meat products in amounts of e. g., 10% to 35%.

The new colloidal products are also valuable as above indicated for use in canned poultry or other canned meat products where the meat is cut up into pieces and placed in cans. The new colloidal products are advantageously used with such meat pieces to fill the interstices or to form a matrix with the pieces of meat distributed therein, giving a can of meat filled with meat pieces or chunks surrounded by the colloidal gelatinous matrix. Meat which is deficient in bone constituent can thus be supplemented with the colloidal products to give a more balanced food product which supplies desirable mineral constituents.

In making the canned chicken or other poultry products or other canned meat products, the meat may be precooked and the colloidal poultry material may be precooked and introduced into the can in a precooked state and subsequently sterilized in the can. Uncooked meat and uncooked colloidal material can similarly be placed in the can and sterilized or cooked in the can.

In utilizing the new colloidal poultry product for food purposes, vitamin D is advantageously added to supplement the normal vitamin D content of the poultry material and to promote the assimilation or metabolism of the calcium and phosphorus.

The new colloidal bone product is also advantageously utilized as an ingredient of infant foods such as "Pablum," strained meat products for infants, etc., since it supplies the calcium and phosphorus as well as the other food constituents of the bone in a particularly advantageous form. It may be added, e. g., to the extent of 2 to 10% of the product.

The new colloidal product is a valuable product not only as an adjunct or food product for human food but is also advantageous for use in animal foods or poultry foods, e. g., to the extent of 10 to 35%, making both the inorganic and the organic constituents of the bone readily available to supply dietary deficiencies in these constituents. The colloidal product can thus be admixed with other constituents of chicken feed or of animal feed or can be separately supplied as a supplemental food product. In canned animal food, e. g., canned dog meat or canned food providing a balanced ration, the colloidal bone product of the present invention can advantageously be added to supply the calcium and phosphorus requirements and to contribute other valuable food constituents.

In the above illustrative example the poultry, such as chicken, is first cooked to permit separation of meat suitable for canning and the bones and other material not suitable for canning are treated to convert them into the colloidal product. Poultry can also be treated before being cooked to separate the more valuable and readily removable portions and to leave the low grade portions including the bones, necks, wings, portions of the back, etc., where it is difficult to separate the meat from the bone. Such low grade chicken products, from which the more valuable meat constituents or the more valuable portions of the chicken have been first removed, can be subjected to the colloidal disintegration to form a composite product containing the colloidal bone constituents in a homogeneous colloidal matrix containing the other constituents including adhering meat, fat, skin, etc. Where the chicken material so treated is raw or uncooked material the product will be a colloidal uncooked material if the disintegration is carried out below the cooking temperature. It will contain the chicken fat in an exceedingly fine state of subdivision dispersed throughout the protein and other material in the form of a homogeneous matrix and with all parts of the colloidal product in a condition which promotes assimilation of the product as a food product. Such a colloidal product, if made of uncooked poultry parts, and disintegrated to form a colloidal uncooked product can be subsequently cooked or admixed with other materials before cooking.

Where frozen poultry is to be treated it may first have the valuable meat portions removed therefrom while in a frozen state and the resulting low grade frozen portions of the chicken then subjected to grinding and disintegration. The frozen condition of the poultry material facilitates the preliminary disintegration and neutralizes the heat generated during the disintegration of the material.

I claim:

1. The method of treating poultry bones which comprises crushing and disintegrating the bones and continuing the progressive disintegration of the bone material until the entire product is converted into a colloidal mass with the inorganic constituents having a particle size of less than about 10 microns.

2. The process according to claim 1 in which the poultry bones have non-bone poultry ingredients, including meat, admixed therewith and in which the final colloidal product contains the colloidal bone constituents uniformly dispersed in a colloidal organic matrix containing the organic components of the bones and admixed organic material.

3. The method of making canned poultry products which comprises cooking poultry to such an extent that portions of the meat are readily removed from the bones, separating the readily removable meat, subjecting the poultry bones and unseparated meat to disintegration to form a colloidal mass containing the bone particles of colloidal size, less than about 10 microns, adding the separated meat and a portion of the colloidal product to a can and sealing the can, whereby a canned poultry product is obtained containing pieces of poultry meat and the colloidal bone-containing material.

DAVID TORR.

REFERENCES CITED

The following references are of record in the file of this patent:

UNITED STATES PATENTS

| Number | Name | Date |
| --- | --- | --- |
| 259,140 | Harris | June 6, 1882 |
| 1,254,317 | Faust | Jan. 22, 1918 |

OTHER REFERENCES

"Chemical and Metallurgical Engineering," No. 5, May 1938, pages 241, and 242.

"Provender Milling," 1945, by Lockwood, published by Northern Publishing Co., Ltd., New York, page 36.

"Chemical Engineers Handbook," 1950, by John H. Perry, third edition, published by McGraw-Hill Book Company, page 1145, table 43 on page 1154, and emulsification article on pages 1167 to 1169.